US007264303B2

(12) United States Patent
Fukudome et al.

(10) Patent No.: US 7,264,303 B2
(45) Date of Patent: Sep. 4, 2007

(54) BODY PANEL WITH VIBRATION DAMPING MATERIAL, VIBRATION DAMPING MATERIAL COATER, AND DAMPING MATERIAL APPLICATION METHOD

(75) Inventors: Hideki Fukudome, Tokyo (JP); Ryo Ashikawa, Tokyo (JP); Hiroshi Matsuda, Tokyo (JP); Kazuhiko Sato, Tokyo (JP); Makoto Ohkubo, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 37 days.

(21) Appl. No.: 10/488,464

(22) PCT Filed: Sep. 27, 2002

(86) PCT No.: PCT/JP02/10086

§ 371 (c)(1), (2), (4) Date: Mar. 4, 2004

(87) PCT Pub. No.: WO03/031078

PCT Pub. Date: Apr. 17, 2003

(65) Prior Publication Data

US 2004/0239150 A1 Dec. 2, 2004

(30) Foreign Application Priority Data

Oct. 2, 2001 (JP) ............................ 2001-306444

(51) Int. Cl.
*B60R 13/04* (2006.01)

(52) U.S. Cl. ............ 296/191; 296/193.05; 296/193.08; 296/193.09; 296/187.03

(58) Field of Classification Search ........... 296/193.07, 296/187.08, 191, 193.05, 193.08, 193.09, 296/193.11, 187.03, 187.09, 187.11, 187.12; 239/549, 550
See application file for complete search history.

(56) References Cited

U.S. PATENT DOCUMENTS

| | | | | |
|---|---|---|---|---|
| 4,346,782 | A | 8/1982 | Bohm | |
| 4,891,273 | A * | 1/1990 | Odashima et al. | .......... 428/623 |
| 5,227,592 | A | 7/1993 | Koster et al. | |
| 6,861,100 | B1 | 3/2005 | Schucker | |

FOREIGN PATENT DOCUMENTS

| | | | |
|---|---|---|---|
| DE | 28 52 828 | B1 | 6/1980 |
| DE | 40 13 318 | A1 | 10/1991 |
| DE | 199 56 335 | A1 | 5/2001 |
| EP | 0 493 123 | A1 | 7/1992 |
| JP | 05-016291 | A | 1/1993 |
| JP | 05-230257 | A | 9/1993 |
| JP | 08-073648 | A | 3/1996 |
| JP | 8-182961 | | 7/1996 |

* cited by examiner

*Primary Examiner*—Lori L. Lyjak
(74) *Attorney, Agent, or Firm*—Birch, Stewart, Kolasch & Birch, LLP

(57) ABSTRACT

As a wrist portion of an application robot equipped with a plurality of application nozzles moves in a predetermined operation pattern, viscous damping and constraining materials having different properties are simultaneously injected from the application nozzles so that immediately after the damping material is injected from the preceding application nozzle, as viewed in the moving direction and applied to a vehicle body panel as an underlayer material, the constraining material having different property is injected from the succeeding application nozzle, as viewed in the moving direction, and applied as an overlayer material over the underlayer material.

7 Claims, 8 Drawing Sheets

| | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| SURFACE DENSITY (kg/m²) | 3.9 | 3.9 | 4.0 | 3.9 | 3.0 | 6.5 |

| | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| SURFACE DENSITY (kg/m²) | 3.9 | 3.9 | 4.0 | 3.9 | 3.0 | 6.5 |

| | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| SURFACE DENSITY (kg/m$^2$) | 3.9 | 3.9 | 4.0 | 3.9 | 3.0 | 6.5 |

BODY PANEL WITH VIBRATION DAMPING MATERIAL, VIBRATION DAMPING MATERIAL COATER, AND DAMPING MATERIAL APPLICATION METHOD

This application is the national phase under 35 U.S.C. § 371 of PCT International Application No. PCT/JP02/10086 which has an International filing date of Sep. 27, 2002, which designated the United States of America.

TECHNICAL FIELD

The present invention relates to a vehicle body panel applied with a damping material, a damping material application device and a damping material attaching method, and more particularly, to techniques for applying viscous damping material to a body panel of a motor vehicle or the like.

BACKGROUND ART

A body of a motor vehicle or the like is affixed with a vibration/sound insulation material, namely, a damping material (asphalt sheet etc.) in order to reduce interior noise of the vehicle. When affixing the damping material to the vehicle body, it is customary to set a sheet-like material onto the vehicle body and bond the material to the vehicle body by applying heat thereto in a paint baking process.

To enhance the rigidity and damping effect of the damping material, it is also customary to overlay the damping material with a sheet-like constraining material (thermosetting resin sheet etc.), which is a kind of damping material.

In the case where such sheet-like materials are used as the damping or constraining material, however, it is necessary to prepare various sheets matching the shapes etc. of vehicle bodies, and also a problem arises in that much time and labor are required to lay the various sheets on the vehicle bodies.

In view of this, Examined Japanese Patent Publication No. Sho 56-23662 discloses a technique of applying a viscous damping material to a vehicle body to provide the vehicle body with the damping material.

According to the technique disclosed in this publication, however, the vehicle body is applied only with a single layer of viscous damping material. Such a single layer of damping material can provide a damping effect to a certain degree, but the available damping performance is inferior to that achieved by the aforementioned double sheet structure of damping and constraining materials.

After a viscous damping material is applied to the vehicle body, a viscous constraining material may be applied over the damping material. In this case, however, the application of both the damping and constraining materials needs to be completed in a very short working time. Moreover, there arises a problem of how efficiently the damping and constraining materials, both having viscosity, should be applied to the vehicle body in a so-called Wet-On-Wet state while at the same time ensuring sufficient damping performance.

To enable efficient application of the damping and constraining materials to the vehicle body while ensuring sufficient damping performance, a problem of what compositions should be selected for the damping and constraining materials needs to be solved. The selection of the constraining material, in particular, is essential because the material is required to have the following characteristics among others: (1) The constraining material should exhibit sufficiently high rigidity and the effect of constraining the damping material in an operating temperature range. (2) The constraining material should not hinder the drying of the underlying damping material and yet should dry and harden itself with heat applied during the paint baking process. (3) The constraining material should have such a viscosity characteristic as to permit the damping and constraining materials to be simultaneously applied during the application process.

DISCLOSURE OF THE INVENTION

The present invention has been made to solve the above problems. An object of the invention is to provide a vehicle body panel to which viscous damping and constraining materials are efficiently applied so as to secure sufficient damping performance, a damping material application device capable of efficiently applying viscous damping and constraining materials to a vehicle body so as to secure sufficient damping performance, and a damping material attaching method which permits viscous damping and constraining materials to be efficiently attached to a vehicle body so as to secure sufficient damping performance.

To achieve the above object, a vehicle body panel is applied with a damping material, wherein the damping material comprises an underlayer material and an overlayer material, and the underlayer material and the overlayer material have respective different compositions prepared to contain, based on 100 weight % of the respective materials, 10 to 40 solid (dry) weight % of aqueous viscoelastic polymer, 30 to 70 weight % of filler, 1 to 5 weight % of additive and crosslinking agent, and 15 to 40 weight % of water.

It is therefore possible to obtain a vehicle body panel which is applied, as the underlayer material (damping material) and the overlayer material (constraining material), with viscous materials having optimum compositions, and since the damping material can be attached during the application process, the working efficiency improves.

A vehicle body panel is applied with a damping material, wherein the damping material comprises an underlayer material and an overlayer material, the underlayer material has a composition such that a loss factor thereof after drying and hardening shows a maximum value within a range from 10° C. to 40° C., and the overlayer material has a composition such that a loss factor thereof after drying and hardening shows a maximum value at 50° C. or above.

Accordingly, not only the working efficiency can be improved by attaching the damping material during the application process but, despite the use of application, it is possible to obtain a vehicle body having sufficient damping performance equivalent to that of conventional ones in which sheet-like damping and constraining materials are laid one over the other.

The vehicle body panel applied with a damping material is preferably applied to a front floor panel of the vehicle body.

This arrangement makes it possible to obtain the effect of reducing vibrations transmitted to the floor during idling and running, thereby reducing the interior noise of the vehicle.

A damping material application device comprises: an application robot installed for a process prior to a sealer baking process or a paint baking process, the application robot being capable of moving a wrist portion thereof along a vehicle body panel in accordance with a predetermined operation pattern during one operation process; a plurality of application nozzles attached to the wrist portion and arranged along a movement path of the wrist portion, the application nozzles injecting viscous damping materials of different properties from jet holes thereof so as to form planes of injection perpendicular to the movement path; damping material feeding means for feeding the viscous damping materials of different properties to the respective jet holes of the application nozzles; and control means for selecting, with respect to each portion of the vehicle body panel requiring the damping material, application nozzles that are to simultaneously inject the viscous damping materials of different properties, from among the plurality of application nozzles, to control the number of layers of the damping materials to be applied to the vehicle body panel by the application robot.

Thus, application nozzles that are to simultaneously inject the viscous damping materials of different properties are selected by the control means from among the application nozzles, in accordance with the number of layers that need to be applied to each portion of the vehicle body panel. Subsequently, the wrist portion of the application robot provided with the application nozzles moves in accordance with the predetermined operation pattern, while injecting the viscous damping materials of different properties simultaneously from the application nozzles. In this case, the foremost application nozzle as viewed in the moving direction injects the damping material to the vehicle body panel as an underlayer material, and immediately thereafter, the succeeding application nozzle injects the viscous damping material of different property to the vehicle body panel, thereby applying the viscous damping material, as an overlayer material, over the underlayer material.

Consequently, the underlayer material (damping material) and the overlayer material (constraining material) are substantially simultaneously applied to the vehicle body panel one over the other as required. This makes it possible to improve the working efficiency and to provide a vehicle body having sufficient damping performance equivalent to that of conventional ones in which sheet-like damping and constraining materials are laid one over the other. Also, the amounts of the materials to be applied can be controlled to their minimum values, whereby the weight of the vehicle body can be reduced.

In the damping material application device, the control means controls the plurality of application nozzles in such a manner that the viscous damping materials of different properties are simultaneously injected from the plurality of application nozzles to a region requiring high damping performance, among portions of the vehicle body panel where the damping material needs to be applied, and that the viscous damping material of identical property is injected from part of the application nozzles to other regions among the damping material-requiring portions of the vehicle body panel.

Thus, among portions of the vehicle body panel requiring the damping material, a region requiring high damping performance can be substantially simultaneously applied with the underlayer material (damping material) and the overlayer material (constraining material) one over the other, making it possible to provide a vehicle body having sufficient damping performance like conventional ones in which sheet-like damping and constraining materials are laid one over the other. In this manner, the regions where the damping capability is of importance are treated differently from other regions, whereby the material costs as well as the weight of the vehicle body can be reduced.

A damping material attaching method comprises: a first step of applying, prior to a sealer baking process or a paint baking process, a viscous damping material comprising underlayer and overlayer materials of different properties simultaneously to a vehicle body panel in such a manner that immediately after the underlayer material is applied, the overlayer material is applied over the underlayer material during an identical operation process; and a second step of drying and hardening the viscous damping material applied to the vehicle body panel during the sealer baking process or the paint baking process.

Thus, immediately after the damping material is injected from an application nozzle and applied to the vehicle body panel as the underlayer material, a viscous damping material with different property is injected from a succeeding application nozzle, as viewed in the direction of movement of the application nozzles, and applied over the underlayer material as the overlayer material. The viscous damping materials applied in this manner to the vehicle body panel are dried and hardened during the sealer baking process or the paint baking process.

As a consequence, it is possible to improve the working efficiency and also to obtain a vehicle body having sufficient damping performance equivalent to that of conventional ones in which sheet-like damping and constraining materials are laid one over the other, while making use of existing equipment (sealer oven, paint oven, etc.). Furthermore, the amounts of the materials to be applied can be controlled to their respective minimum values, whereby the weight of the vehicle body can be reduced.

BEST MODE FOR CARRYING OUT THE INVENTION

Embodiments of the present invention will be hereinafter described with reference to the accompanying drawings.

Figure 1:
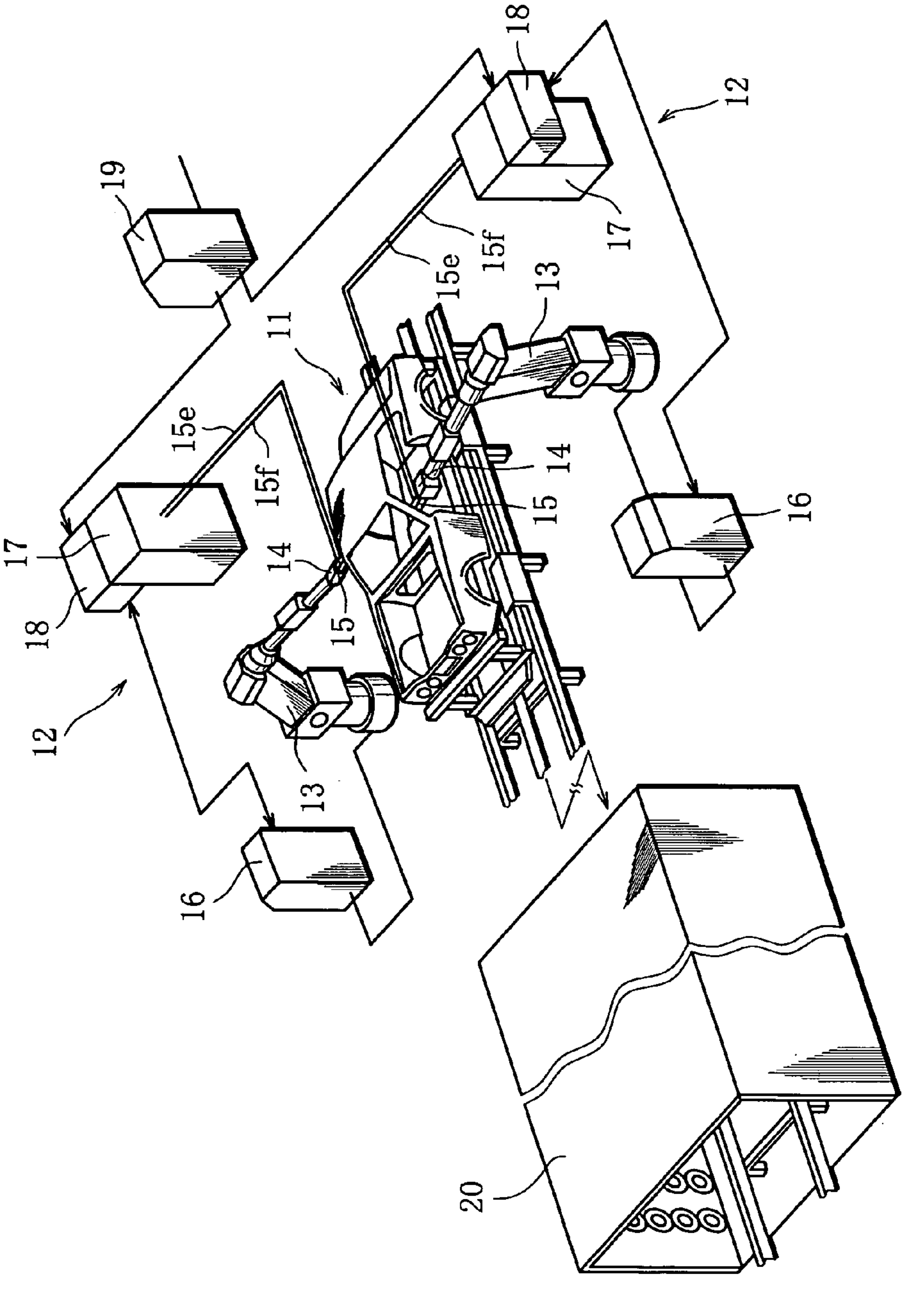
FIG. 1 is a view showing an entire arrangement of a damping material attachment apparatus including a damping material application device according to the present invention.

Referring to FIG. 1, there is shown an entire arrangement of a damping material attachment apparatus including a damping material application device according to the present invention.

As shown in the figure, an application device 12 is arranged on a painting line for performing a damping material application process prior to, for example, a sealer oven 20, and applies a damping material (underlayer material) as a viscous material and a constraining material (overlayer material), which is a kind of damping material, to a vehicle body 11.

The application device 12 comprises a pair of robots (application robots) 13 as manipulators on the right and left sides of the painting line, and each robot 13 has a wrist portion 14 equipped with an application nozzle unit 15. An operation pattern for each vehicle type, obtained through teaching or the like, is stored beforehand in the robots 13 in accordance with commands from respective controllers 16, and the robots 13 operate in accordance with the operation pattern.

Figure 2:
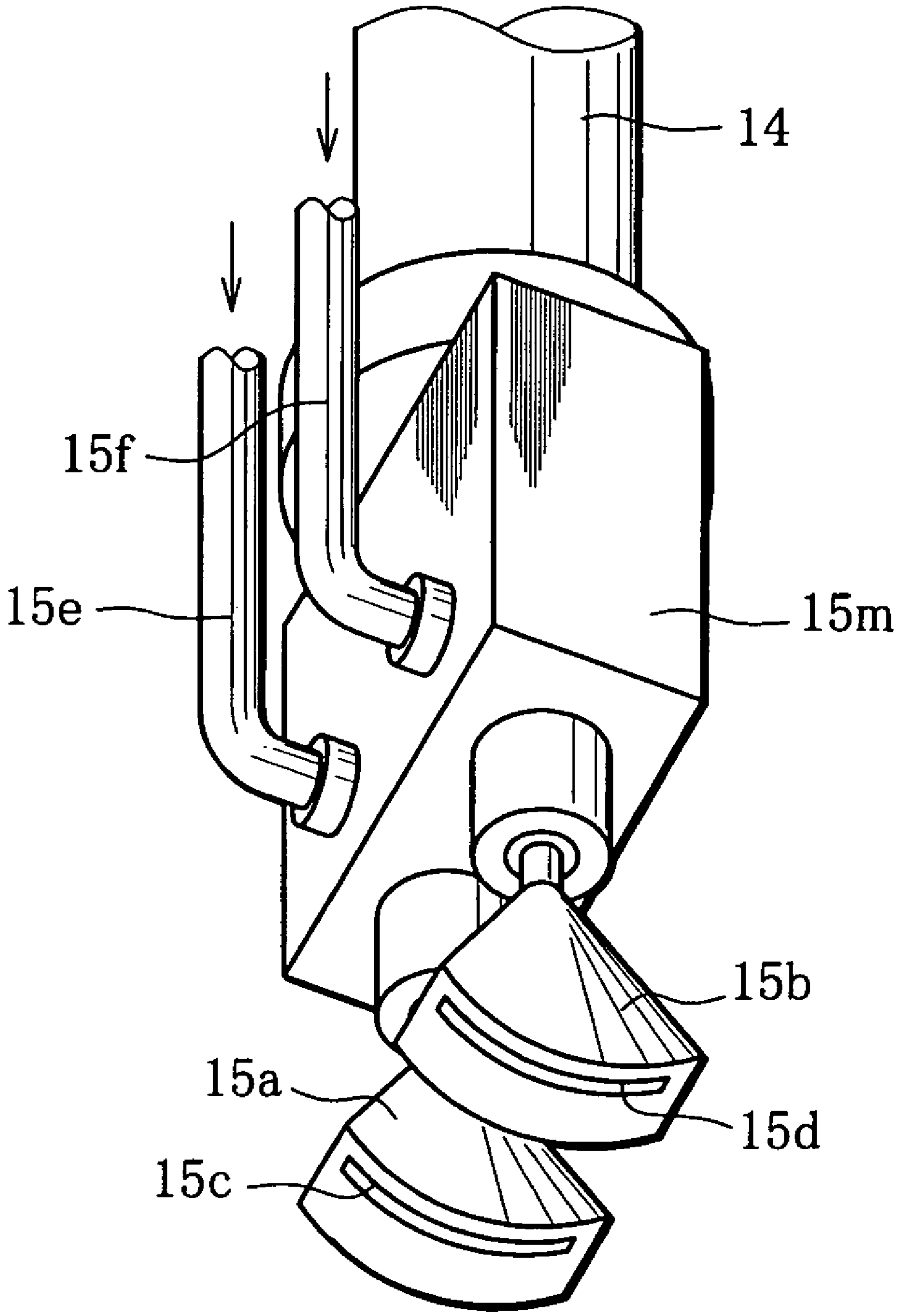
FIG. 2 is a view showing an application nozzle unit according to the present invention in detail.

FIG. 2 illustrates the application nozzle unit 15 in detail. As shown in the figure, the application nozzle unit 15 has a main body 15*m* to which are attached fan-shaped application nozzles 15*a* and 15*b* directed in the same direction. Slit-like jet holes 15*c* and 15*d* are formed in distal end faces of the application nozzles 15*a* and 15*b*, respectively, for injecting the damping and constraining materials which are viscous materials. Also, distal ends of hoses 15*e* and 15*f* are fixed to the main body 15*m* so as to communicate with the jet holes 15*c* and 15*d*, respectively, through the interior of the main body 15*m*. The other ends of the hoses 15*e* and 15*f* are connected to a corresponding application material feeding device (damping material feeding means) 17.

Each of the application material feeding devices 17 is provided with an application controller 18. Thus, when commands are output from the application controller 18 in synchronism with movement of the robot 13, the damping and constraining materials having viscosity are supplied from the application material feeding device 17 to the application nozzles 15*a* and 15*b* through the hoses 15*e* and 15*f*, and are injected from the jet holes 15*c* and 15*d* each in the form of a fan such that injection planes thereof are parallel to each other.

The application controllers 18 are connected to a line control device 19 of the painting line and are input with information about a vehicle type from the control device 19. The vehicle type information input to each application controller 18 is sent to the corresponding controller 16, which then supplies the application controller 18 with information about an operation of the robot 13 corresponding to the vehicle type. Accordingly, each robot 13 operates in accordance with a predetermined operation pattern corresponding to the vehicle type information, and the application material feeding device 17 supplies the damping and constraining materials to the application nozzles 15*a* and 15*b* as instructed. That is, in synchronism with the operation of the robot 13, the application nozzles 15*a* and 15*b* apply suitable amounts of the damping and constraining materials to a predetermined portion of the vehicle body 11.

As the damping and constraining materials, a viscous material containing resin emulsion as a main component and having a suitable viscosity (e.g., 30 to 150 Pa·s) is used in consideration of sprayability, sag property, external appearance, etc. at the time of application. In the following, the most suitable damping and constraining materials will be described in detail.

The damping and constraining materials are each prepared by adding a filler, an additive and a crosslinking agent to an aqueous viscoelastic polymer.

The aqueous viscoelastic polymer to be used includes synthetic resin emulsions (e.g., emulsions of synthetic resins such as acrylic copolymer, styrene-acrylic copolymer, polyvinyl acetate, ethylene-vinyl acetate copolymer, urethane resin, etc.), rubber latexes (styrene-butadiene rubber (SBR), acrylonitrile-butadiene rubber (NBR), etc.), and latexes of block polymers (styrene-isoprene-styrene (SIS), styrene-butadiene-styrene (SBS), etc.). One or more of the synthetic resin emulsions, the rubber latexes and the block polymer latexes are used as the aqueous viscoelastic polymer.

The filler to be used includes inorganic fillers (for the aqueous polymer, calcium carbonate, talc, clay, alumina, barium sulfate, mica, wallastonite, sepiolite, diatomite, glass powder, etc.) and fine powders of polymers (polyethylene, polystyrene, acrylic resin, ethylene-vinyl acetate resin, etc.). One or more of the inorganic fillers and the polymer fine powders are used as the filler.

As the additive for improving dispersibility, workability, etc., antifoaming agent, dispersant, thickener, surface-active agent, coating auxiliary agent, solvent, etc. may be added. The crosslinking agent includes epoxy, oxazoline, zinc flower, etc.

The damping material and the constraining material have respective different compositions (properties) but prepared to contain, based on 100 weight % of the respective materials, 10 to 40 solid (dry) weight % of aqueous viscoelastic polymer, 30 to 70 weight % of filler, 1 to 5 weight % of additive and crosslinking agent, and 15 to 40 weight % of water.

The content of the aqueous viscoelastic polymer is set to 10 to 40 solid (dry) weight % for the following reasons: If the content of the viscoelastic polymer is lower than 10 solid (dry) weight %, the effect of the material as the constraining layer lowers because of lowering of a binder effect (crosslinking effect) (which leads to difficulty in forming satisfactory coating including the filler) and frequent occurrence of cracks during the baking, or the coating becomes brittle after drying and hardening, possibly causing cracking in the subsequent processes. If the content of the viscoelastic polymer is higher than 40 solid (dry) weight %, the elastic modulus and the rigidity-imparting effect lower while the temperature dependency of the elastic modulus noticeably increases, which narrows a temperature range in which excellent rigidity-imparting effect can be achieved, or notable swelling occurs at the time of baking.

The content of the filler is set to 30 to 70 weight % for the following reasons: If the content of the filler is lower than 30 weight %, the elastic modulus and the rigidity-imparting effect lower while the temperature dependency of the elastic modulus noticeably increases, which narrows a temperature range in which excellent rigidity-imparting effect can be achieved, or notable swelling occurs at the time of baking. If the filler is contained in excess of 70 weight %, the effect of the material as the constraining layer lowers because of lowering of the binder effect and frequent occurrence of cracks during the baking, or the coating becomes brittle after drying and hardening, possibly causing cracking in the subsequent processes.

The water content is set to 15 to 40 weight % for the following reasons: If the water content is lower than 15 weight %, it is difficult to ensure satisfactory workability (sprayability). If water is contained in excess of 40 weight %, the quantity of water vaporized at the time of heating and hardening (drying) increases, so that cracking is liable to occur due to swelling or reduction in volume, lowering the effect of the material as the constraining layer.

Figure 3:
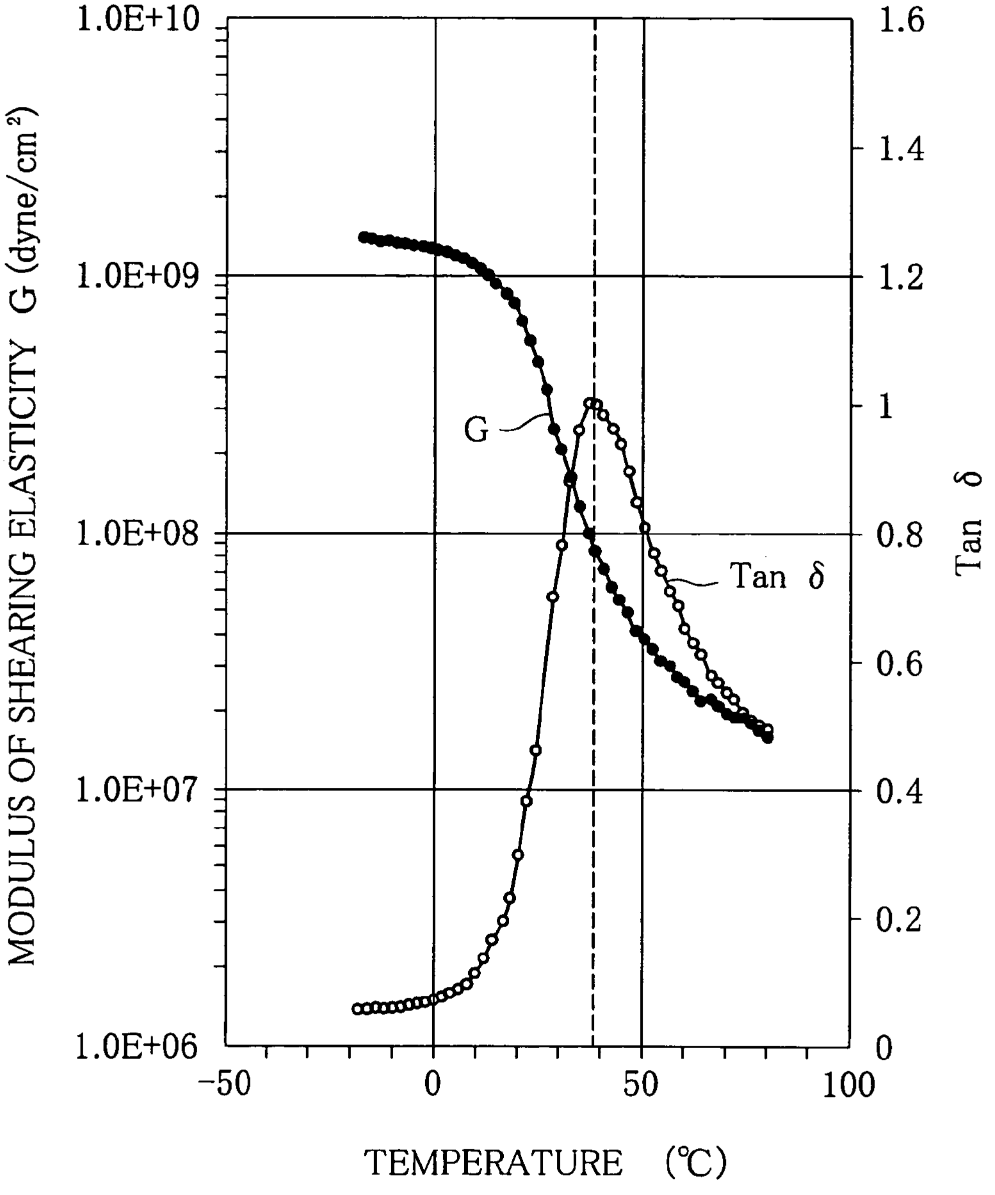
FIG. 3 is a graph showing viscoelasticity-temperature characteristics required for a damping material.

Specifically, the damping material is required to have a viscoelasticity-temperature characteristic such that it exhibits a satisfactory damping effect within a target operating temperature range, namely, such that a loss elastic modulus (Tan δ) thereof (○ marks) has a peak within a temperature range of from about +10° C. to about +40° C., as shown in FIG. 3, which is a diagram showing a viscoelasticity-temperature characteristic required for the damping material. Thus, the composition of the damping material is adjusted so as to fulfill the requirement. In concrete terms, since the viscoelasticity-temperature characteristic is influenced by the glass transition temperature (Tg) of the aqueous viscoelastic polymer and the amount of the filler added, the glass transition temperature and the amount of the filler are adjusted.

Figure 4:
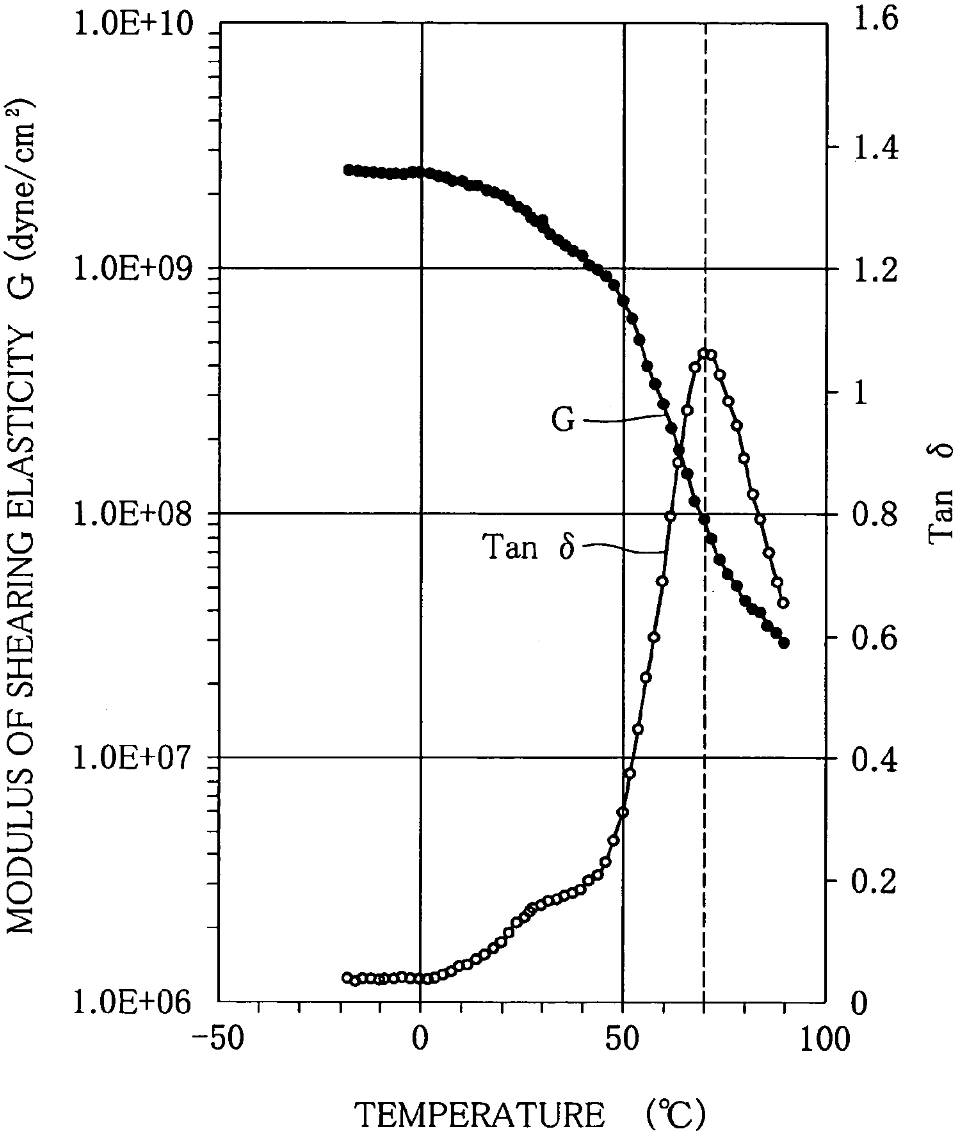
FIG. 4 is a graph showing viscoelasticity-temperature characteristics required for a constraining material.

On the other hand, the constraining material is required to have the effect of constraining movement of the underlying damping material. Specifically, the constraining material should be made of a material such that it has a rigidity, that is, a modulus of shearing elasticity G (● marks) larger than that of the damping material within the temperature range of from about +10° C. to about +40° C., and that a loss elastic modulus (Tan δ) thereof (○ marks) shows a peak at a temperature (e.g., +50° C. or above) higher than the peak temperature of the damping material by 10° C. or more, as shown in FIG. 4, which is a diagram showing a viscoelasticity-temperature characteristic required for the constraining material. Thus, the composition of the constraining material is adjusted so as to fulfill the requirements. Also in this case, the glass transition temperature (Tg) and the amount of the filler to be added are adjusted. Moreover, the rigidity-imparting effect may be heightened by increasing the amount of the crosslinking agent or the like.

In addition to the aforementioned components, the damping and constraining materials may be admixed with emulsion of adhesion-imparting synthetic resin such as phenol resin, petroleum resin, rosin ester, terpene phenol, etc.

The following explains operation of the damping material attachment apparatus constructed as described above, that is, a damping material attaching method, and advantageous effects of a vehicle body panel to which the damping material is attached by means of the damping material attachment apparatus.

First, the damping material attaching method will be described.

When the vehicle body 11 proceeds to the damping material application process, the vehicle type information is sent from the line control device 19 to the application controllers 18 and the controllers 16, as mentioned above. In accordance with the vehicle type information, the robots 13 move their wrist portions 14 according to a predetermined operation pattern, and the application material feeding devices 17 supply the damping and constraining materials to the application nozzles 15*a* and 15*b* at suitable timings as instructed, to apply suitable amounts of the damping and constraining materials to a predetermined portion of the vehicle body 11. Specifically, the vehicle body 11 has multiple portions requiring the damping material, and with respect to each of the multiple portions, suitable amounts of the damping and constraining materials are applied in a manner appropriately timed with the movement of the wrist portion 14 of the robot 13.

Figure 5:
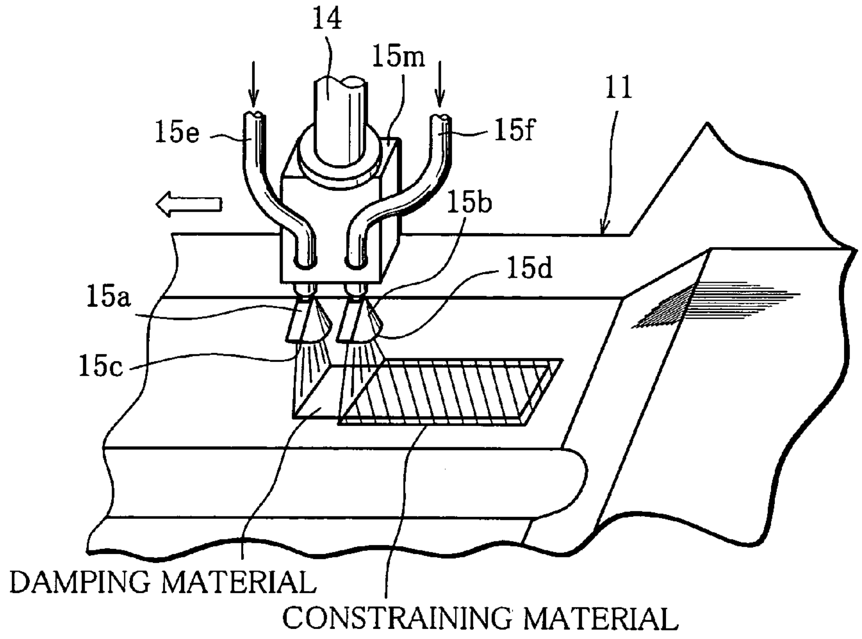
FIG. 5 is a view showing a state in which the damping material and the constraining material are being applied to a predetermined portion of a vehicle body.

FIG. 5 shows a state in which the damping and constraining materials are being applied to a predetermined portion of the floor of the vehicle body 11. As shown in the figure, the wrist portion 14 of the robot 13 moves in a direction (outline arrow) such that the application nozzle 15*a* for injecting the damping material and the application nozzle 15*b* for injecting the constraining material are situated along a path of movement of the wrist portion 14, and at the same time that the application nozzle 15*a* is located ahead of the application nozzle 15*b* in the moving direction of the wrist portion 14. In time with the movement of the wrist portion 14, the damping material and the constraining material are injected from the application nozzles 15*a* and 15*b*, respectively (first step).

Specifically, as shown in the figure, immediately after the damping material (blank portion) is applied to the vehicle body panel as an underlayer material, the constraining material (hatched portion) as an overlayer material is applied over the damping material. This makes it possible to attach the damping and constraining materials to the vehicle body 11 at a time in a short working time, thereby improving the working efficiency.

Furthermore, by applying the damping and constraining materials to the floor of the vehicle body 11, it is possible to obtain the effect of reducing vibrations transmitted to the floor during idling and running and thus reducing the interior noise of the vehicle.

Among portions of the vehicle body requiring the damping material, there are regions where especially high damping effect is needed and regions where lower damping effect suffices. In practice, for the regions requiring high damping effect, the application material feeding device 17 selects both of the application nozzles 15*a* and 15*b* and operates the nozzles to apply both the damping and constraining materials in two layers, and for the regions where lower damping effect suffices, only the application nozzle 15*a* is operated to apply the damping material alone (control means). Exemplary regions to be applied with the two layers include front floor panel portions under the driver seat and the front passenger seat. Exemplary regions to be applied with the single layer are a rear floor panel portion and a rear seat pan portion.

That is, the constraining material is used as needed, and this permits reduction in the material costs and in the weight of the vehicle body 11. Moreover, the amounts of the damping and constraining materials to be applied can be controlled to their respective minimum values, also contributing to reduction in the weight of the vehicle body 11.

As the vehicle body 11 applied with the damping and constraining materials passes the sealer oven 20 and subsequent intermediate coating oven and finish coating oven of the painting line, the damping and constraining materials are dried and hardened by heat applied thereto in the respective ovens (second step). Specifically, the damping and constraining materials each contain the aqueous viscoelastic polymer, namely, water, and the water evaporates due to heat. As a result, the damping and constraining materials can exhibit the respective required damping performances.

In the following, the advantageous effects of the vehicle body panel applied with the damping material will be described.

Figure 6:
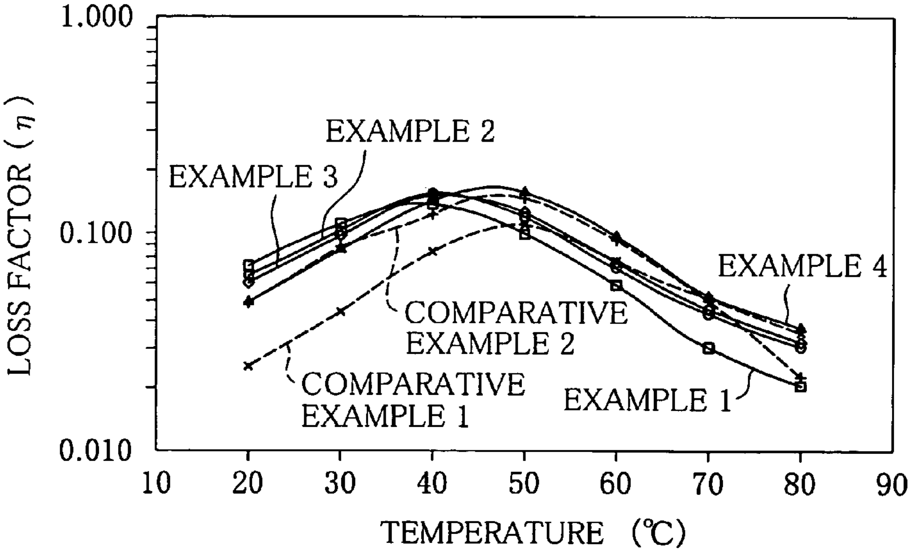
FIG. 6 is a diagram showing evaluation results of loss factor ($\eta$) observed in cases where the damping material and the constraining material are applied in two layers.
Figure 7:
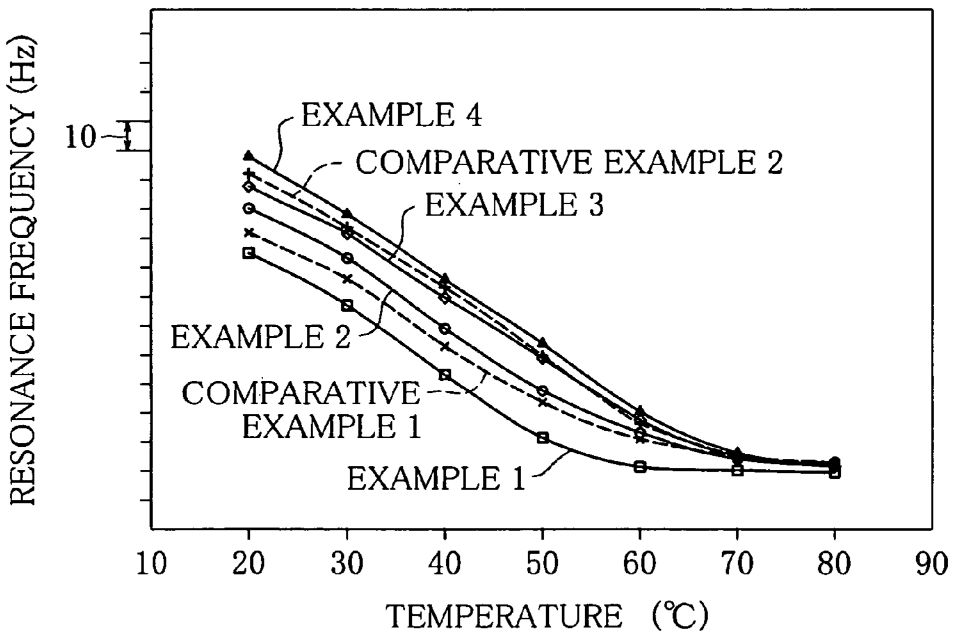
FIG. 7 is a diagram showing evaluation results of rigidity-imparting effect (secondary resonance frequency) observed in cases where the damping material and the constraining material are applied in two layers.
Figure 8:
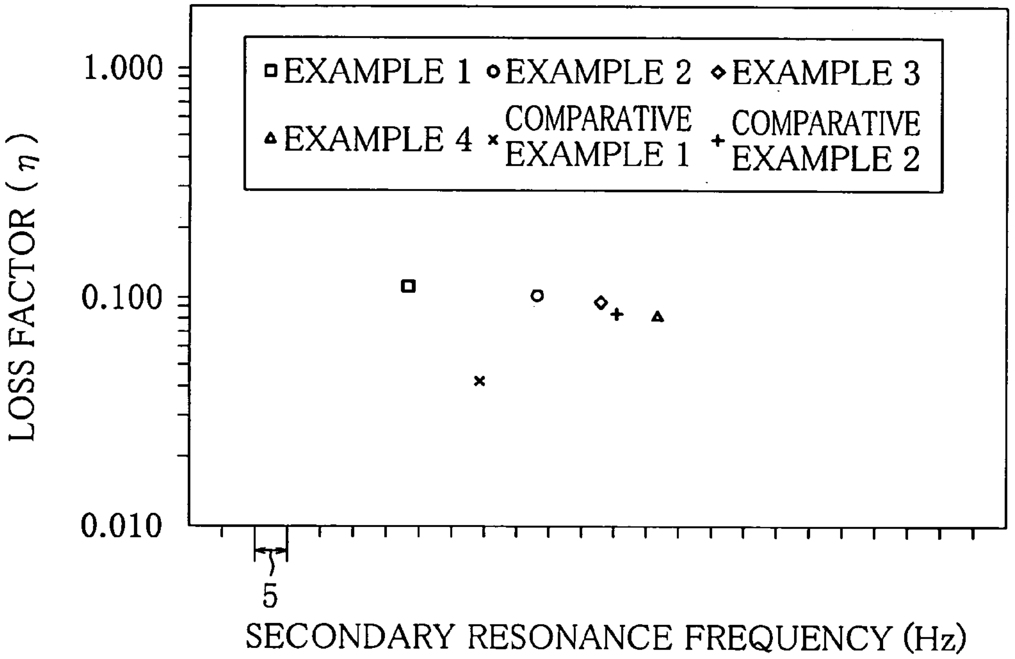
FIG. 8 is a diagram showing the relation between loss factor ($\eta$) and rigidity-imparting effect (secondary resonance frequency) at an average operating temperature (e.g., 30° C.)

Table 1 and FIGS. 6, 7 and 8 show evaluation results of the loss factor (η) and the rigidity-imparting effect (secondary resonance frequency), observed in cantilever test conducted on test pieces applied with two layers of the damping and constraining materials each containing the aqueous viscoelastic polymer, with temperature varied. For the purpose of comparison, the table and the figures also show a conventional damping structure having sheet-like damping and constraining materials laid one over the other and a damping structure having a single layer applied thereto.

For the test pieces, a steel plate of 220 mm long, 10 mm wide and 1.6 mm thick was used, and the damping and constraining materials were applied to each test piece over an application area of 200 mm by 10 mm and was dried. Specifically, each steel plate as the test piece was applied with the damping material of 2 mm thick as an underlayer, then with the constraining material of 2 mm thick as an overlayer, and was dried and hardened for one hour at 140° C. In the case of the single-layer damping structure, the damping material was applied to a thickness of 3 mm.

used as the damping and constraining materials, the materials can achieve high damping effect equivalent to that of the conventional case where the sheet materials are laid in two layers.

It is also apparent from comparison with the case (Comparative Example 1) where a single layer is applied by using the material whose loss elastic modulus (Tan δ) shows a peak at a temperature of +60° C., the examples having two layers applied using the materials with different compositions exhibit high loss factor (η) as well as high rigidity-imparting effect (secondary resonance frequency). That is, a single layer of the aqueous viscoelastic polymer having the

TABLE 1

| | Example 1 | Example 2 | Example 3 | Example 4 | Comparativ | Comparativ |
|---|---|---|---|---|---|---|
| Material A | Underlayer | Underlayer | — | — | — | — |
| Material B | Overlayer | — | Underlayer | Underlayer | — | — |
| Material C | — | — | Overlayer | — | — | — |
| Material D | — | Overlayer | — | Overlayer | Single | — |
| Loss Factor (η) at 30° C. | 0.112 | 0.104 | 0.098 | 0.087 | 0.044 | 0.088 |
| Secondary Resonance | 227 | 243 | 251 | 258 | 236 | 253 |
| Surface Density (kg/m$^2$) | 3.9 | 3.9 | 4.0 | 3.9 | 3.0 | 6.5 |

The materials A, B, C and D are styrene acrylic esters whose viscoelasticity-temperature characteristics, that is, compositions (properties) were adjusted such that their loss elastic modulus (Tan δ) showed a peak at temperatures +10° C., +40° C., +50° C. and +60° C., respectively. Example 1 shows a case where the material A was used as the underlayer (damping material) and the material B as the overlayer (constraining material) (□ marks); Example 2 shows a case where the material A was used as the underlayer (damping material) and the material D as the overlayer (constraining material) (○ marks); Example 3 shows a case where the material B was used as the underlayer (damping material) and the material C as the overlayer (constraining material) (◇ marks); and Example 4 shows a case where the material B was used as the underlayer (damping material) and the material D as the overlayer (constraining material) (Δ marks). Further, Comparative Example 1 shows a case where a single layer of the material D alone was applied as the damping material (× marks), and Comparative Example 2 shows a conventional case where sheet-like damping and constraining materials were laid in two layers (+ marks).

It is apparent from the table and the figures that, in cases where two layers were applied whose overlayer (constraining material) showed a peak of loss elastic modulus (Tan δ) at temperatures higher by 10° C. or more than that of the underlayer (damping material), especially in cases where two layers were applied whose underlayer (damping material) showed a peak of loss elastic modulus (Tan δ) at temperatures of +10° C. and +40° C. and whose overlayer (constraining material) showed a peak of loss elastic modulus (Tan δ) at temperatures of +50° C. and +60° C., good results equivalent to that of the conventional case (Comparative Example 2) in which sheet-like materials were laid in two layers could be achieved in respect of both the loss factor (η) and the rigidity-imparting effect (secondary resonance frequency) at an average operating temperature (e.g., 30° C.) of the floor during running of the vehicle.

Namely, where materials having different compositions falling within the aforementioned composition range are aforementioned composition can achieve a satisfactory rigidity-imparting effect (secondary resonance frequency), but by applying the materials in two layers, it is possible to obtain even better results in respect of the rigidity-imparting effect (secondary resonance frequency) and the damping effect.

Table 1 also shows the surface density. Compared with the conventional case (Comparative Example 2) where the sheet materials are laid in two layers, it is apparent that the examples applied with two layers of the damping and constraining materials each containing the aqueous viscoelastic polymer have smaller surface density and thus are light in weight.

Figure 9:
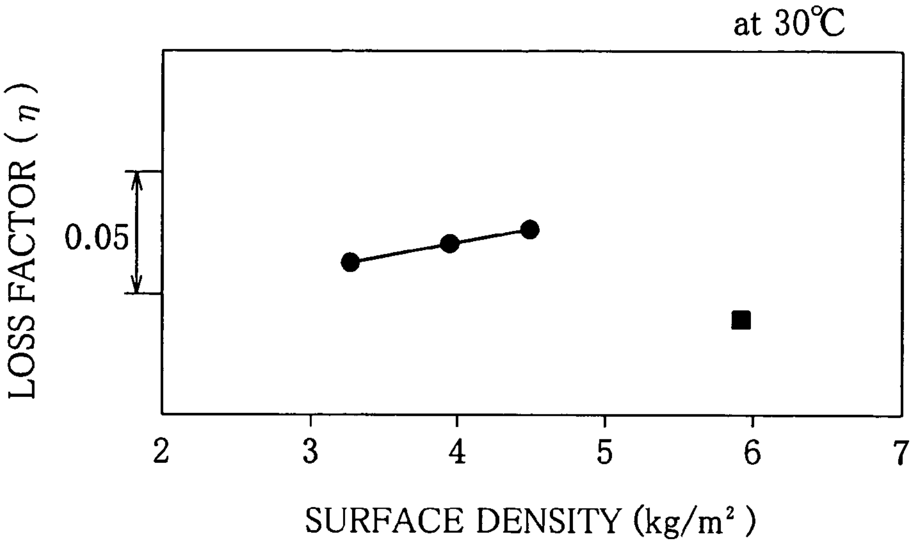
FIG. 9 is a diagram showing the relation between surface density and loss factor ($\eta$) at an average operating temperature (e.g., 30° C.) in cases where the damping material and the constraining material are applied in two layers.
Figure 10:
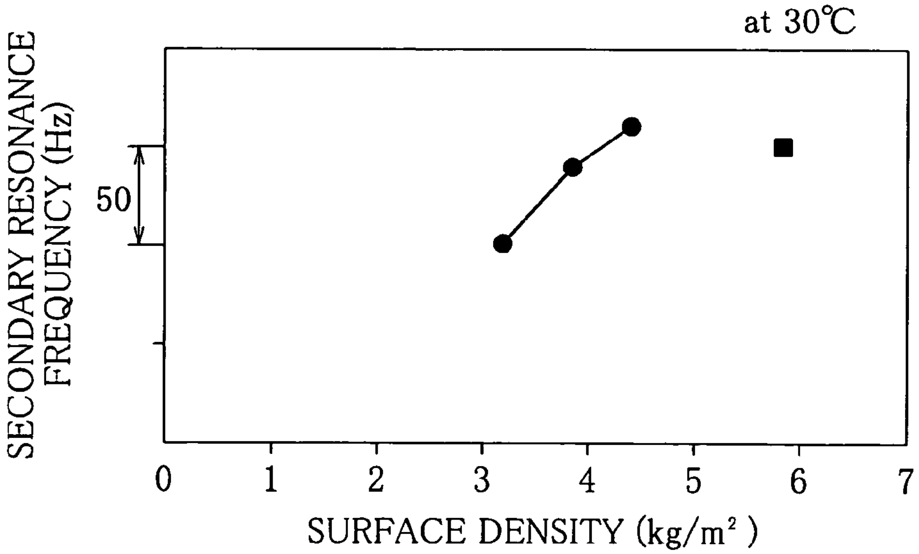
FIG. 10 is a diagram showing the relation between surface density and secondary resonance frequency at an average operating temperature (e.g., 30° C.) in cases where the damping material and the constraining material are applied in two layers.

FIGS. 9 and 10 show the relation between the surface density and the loss factor (η) and between the surface density and the secondary resonance frequency, observed in panel vibration test conducted at an average operating temperature (e.g., 30° C.) on a test piece to which were applied two layers of the damping and constraining materials each containing the aqueous viscoelastic polymer (● marks), in comparison with the conventional case of two sheet materials laid one over the other (■ marks). The figures reveal that the conventional structure having the two sheet materials laid one over the other had a surface density of 6 kg/m$^2$, while the test piece applied with two layers of the damping and constraining materials had a surface density of about 4 to 4.5 kg/m$^2$, showing an effect equivalent to that of the conventional structure.

Namely, by applying two layers of the damping and constraining materials each containing the aqueous viscoelastic polymer, it is possible to reduce the weight of the vehicle body 11, besides the aforementioned weight reducing effect, and at the same time to achieve a damping effect equivalent to that of the conventional case where the sheet materials are laid in two layers.

While the preferred embodiments have been described, the present invention is not limited to the foregoing embodiments alone.

For instance, in the foregoing embodiments, the two application nozzles 15*a* and 15*b* are used to apply the damping material and the constraining material, respectively. Alternatively, three or more application nozzles may be provided to inject and apply materials having respective different properties (compositions). In this case, if the number of the materials to be applied is smaller than that of the application nozzles, the same material may be injected from a plurality of application nozzles.

The invention claimed is:

1. A vehicle body panel applied with a damping material, wherein the damping material comprises:

an underlayer material and an overlayer material, and the underlayer material and the overlayer material have respective different compositions prepared to contain, based on 100 weight % of the respective materials, 10 to 40 solid (dry) weight % of aqueous viscoelastic polymer, 30 to 70 weight % of filler, 1 to 5 weight % of additive and crosslinking agent, and 15 to 40 weight % of water.

2. A vehicle body panel applied with a noise damping material, wherein the noise damping material comprises:

an underlayer material and an overlayer material, the underlayer material has a composition such that a loss elastic modulus (Tan δ) thereof after drying and hardening exhibits a maximum value within a range from 10° C. to 40° C., and the overlayer material has a composition such that the loss elastic modulus (Tan δ) thereof after drying and hardening exhibits a maximum value at 50° C. or above.

3. The vehicle body applied with a damping material according to claim 1, wherein the vehicle body panel is a front floor panel of a vehicle body.

4. A damping material application device comprising:

an application robot installed for a process prior to a sealer baking process or a paint baking process, said application robot being capable of moving a wrist portion thereof along a vehicle body panel in accordance with a predetermined operation pattern during one operation process;

a plurality of application nozzles attached to the wrist portion and arranged along a movement path of the wrist portion, said application muzzles injecting viscous damping materials of different properties from jet holes thereof so as to form planes of injection perpendicular to the movement path;

damping material feeding means for feeding the viscous damping materials of different properties to the respective jet holes of said application nozzles; and control means for selecting, with respect to each portion of the vehicle body panel requiring the damping material, application nozzles that are to simultaneously inject the viscous damping materials of different properties, from among said plurality of application nozzles, to control the number of layers of the damping materials to be applied to the vehicle body panel by said application robot.

5. The damping material application device according to claim 4, wherein said control means controls said plurality of application nozzles in such a manner that the viscous damping materials of different properties are simultaneously injected from said plurality of application nozzles to a region requiring high damping performance, among portions of the vehicle body panel where the damping material needs to be applied, and that the viscous damping material of identical property is injected from part of said application nozzles to other regions among the damping material-requiring portions of the vehicle body panel.

6. A damping material attaching method comprising:

a first step of applying, prior to a sealer baking process or a paint baking process, a viscous damping material comprising underlayer and overlayer materials of different properties simultaneously to a vehicle body panel in such a manner that immediately after the underlayer material is applied, the overlayer material is applied over the underlayer material during an identical operation process; and a second step of drying and hardening the viscous damping material applied to the vehicle body panel during the sealer baking process or the paint baking process.

7. The vehicle body panel applied with a damping material according to claim 2, wherein the vehicle body panel is a front floor panel of a vehicle body.

* * * * *